US007707511B2

(12) United States Patent
Peterson

(10) Patent No.: US 7,707,511 B2
(45) Date of Patent: *Apr. 27, 2010

(54) INTERACTIVE RISK MANAGEMENT SYSTEM AND METHOD

(76) Inventor: Gary Edward Peterson, 205 Hamilton Rd., Ridgewood, NJ (US) 07450

( * ) Notice: Subject to any disclaimer, the term of this patent is extended or adjusted under 35 U.S.C. 154(b) by 733 days.

This patent is subject to a terminal disclaimer.

(21) Appl. No.: 10/868,484

(22) Filed: Jun. 14, 2004

(65) Prior Publication Data

US 2005/0108083 A1 May 19, 2005

Related U.S. Application Data

(63) Continuation-in-part of application No. 10/716,893, filed on Nov. 18, 2003.

(51) Int. Cl.
G06F 3/048 (2006.01)
G06Q 40/00 (2006.01)
(52) U.S. Cl. .............. 715/771; 715/762; 715/738; 705/38; 705/39; 709/223; 709/224
(58) Field of Classification Search .......... 715/771, 715/762, 736, 738; 705/38, 397, 10, 11, 705/7; 709/223, 224
See application file for complete search history.

(56) References Cited

U.S. PATENT DOCUMENTS

| | | | | |
|---|---|---|---|---|
| 6,385,589 | B1 * | 5/2002 | Trusheim et al. | 705/2 |
| 6,408,292 | B1 * | 6/2002 | Bakalash et al. | 707/2 |
| 6,823,495 | B1 * | 11/2004 | Vedula et al. | 715/805 |
| 6,850,643 | B1 * | 2/2005 | Smith et al. | 382/173 |
| 6,850,908 | B1 * | 2/2005 | Smith et al. | 705/38 |
| 2001/0027388 | A1 * | 10/2001 | Beverina et al. | 703/22 |
| 2002/0049617 | A1 | 4/2002 | Lencki et al. | |
| 2002/0055862 | A1 | 5/2002 | Jinks | |
| 2002/0143578 | A1 | 10/2002 | Cole et al. | |
| 2003/0009411 | A1 * | 1/2003 | Ram et al. | 705/37 |
| 2003/0065613 | A1 | 4/2003 | Smith | |
| 2003/0078869 | A1 | 4/2003 | Williams | |
| 2004/0122756 | A1 * | 6/2004 | Creeden et al. | 705/35 |
| 2004/0199445 | A1 | 10/2004 | Eder | |
| 2004/0215551 | A1 * | 10/2004 | Eder | 705/38 |
| 2005/0197952 | A1 * | 9/2005 | Shea et al. | 705/38 |
| 2005/0210047 | A1 * | 9/2005 | Hayes et al. | 707/100 |
| 2005/0225549 | A1 * | 10/2005 | Diamond et al. | 345/418 |
| 2005/0273352 | A1 * | 12/2005 | Moffat et al. | 705/1 |
| 2006/0064334 | A1 * | 3/2006 | Stecker | 705/7 |
| 2006/0100912 | A1 * | 5/2006 | Kumar et al. | 705/4 |

(Continued)

OTHER PUBLICATIONS

USPTO U.S. Appl. No. 10/716,893, Office Action Oct. 14, 2008.

(Continued)

Primary Examiner—Tadeese Hailu
(74) Attorney, Agent, or Firm—Abelman, Frayne & Schwab

(57) ABSTRACT

An interactive risk management system and method for a business or other organization generates a graphic display to the user, through the browser, to display a mapping of processes used in conducting the business or the affairs of the organization and allow the user to selectively view additional data, such as messages describing risks associated with the process selected. The user may navigate thorough and among the processes to access and review associated data, allowing the user to gain information about selected processes and associated risks.

20 Claims, 12 Drawing Sheets

U.S. PATENT DOCUMENTS

| | | | |
|---|---|---|---|
| 2006/0235732 A1* | 10/2006 | Miller et al. | 705/7 |
| 2007/0255655 A1* | 11/2007 | Kemper et al. | 705/39 |
| 2008/0027790 A1* | 1/2008 | Balz et al. | 705/11 |
| 2008/0052054 A1 | 2/2008 | Beverina et al. | |

OTHER PUBLICATIONS

USPTO U.S. Appl. No. 10/716,893, Office Action Apr. 23, 2008.
USPTO U.S. Appl. No. 10/716,893, Office Action Jul. 16, 2007.
USPTO U.S. Appl. No. 10/716,893, Office Action Jan. 30, 2007.
USPTO U.S. Appl. No. 11/223,468, Office Action Jun. 8, 2009.
USPTO U.S. Appl. No. 11/223,468, Office Action Oct. 1, 2008.
USPTO U.S. Appl. No. 11/223,468, Office Action Mar. 31, 2008.
USPTO U.S. Appl. No. 10/716,893, Office Action Jan. 5, 2010.
USPTO U.S. Appl. No. 10/716,893, Amendment Feb. 5, 2010.

* cited by examiner

FIG. 10

| REF | SPECIFIC OPERATIONAL RISK | PRIORITY RANKING (CRITERIA) | RISK ATTRIBUTES (DIR. LOSS, REGULATORY, ETC) | OPERATION RISK ANALYSIS -- CONTROL METRIC | EFFECTIVENESS (MEASUREMENT CRITERIA) | OWNER | CONTROL FREQUENCY | MONITOR FREQUENCY |
|---|---|---|---|---|---|---|---|---|
| 1 | REVIEW AND PROCESS ITEMS IN REPAIR QUEUE | HIGH | REPUTATIONAL AND POTENTIAL DOLLARS LOSS | REPORT OR REPAIRED ITEMS — 312 | | FT | DAILY | WEEKLY |
| 2 | COMPENSATION & INVESTIGATION | HIGH | REPUTATIONAL AND POTENTIAL DOLLARS LOSS | REPORT OF COMPENSATION CLAIMS — 314 | | C + I | DAILY | MONTHLY |

310

INTERACTIVE RISK MANAGEMENT SYSTEM AND METHOD

CROSS-REFERENCE TO RELATED APPLICATIONS

This application is a continuation-in-part application of U.S. application Ser. No. 10/716,893, filed on Nov. 18, 2003, which is incorporated herein by reference.

FIELD OF THE INVENTION

This invention relates to process management, and in particular to an interactive display which provides information for management processes and associated risks.

BACKGROUND OF THE INVENTION

Enterprise reputation risk presents management challenges. Even the finest organization's reputation may suffer serious and even irreparable damage from many disparate causes. Over the past years, risk controls were directed at capital losses arising from trading, market and credit risk. But today, the profound risk which must be identified, mitigated, controlled, and monitored is Enterprise Reputation Risk. Reputation risk, that is the loss of shareholder value resulting from a lack of customer and public confidence in the organization, must be effectively managed.

Reputation risk is very difficult to manage since it may be extremely complex to identify and manage. It requires a coordinated analysis and control of three separate, interrelated risks: business risk, regulatory risk and operational risk. It also requires the identification of sub-risks which may occur throughout any part of an organization: within or between front, back and middle offices, and even between the organization and outsource providers. It also requires the insertion of key controls and monitors, often in areas which have not been previously identified as key control points.

Few organizations have risk reduction methodologies in place across all areas or for all risk areas. Thus, reputation risk remains. For example, organizations such as banks which will follow the Basel II formula, set forth by the Basel Committee on Banking Supervision through the Basel Capital Accord, are already well aware of the limits and complexity of the Basel II methodology. Its principal focus is reducing Operational Risk, and it specifically excludes an analysis of many overlapping areas of risk which give rise to enterprise reputation risk, so the reduction of reputation risk via Basel II is limited.

Business Process Management (BPM) methods also reduce reputation risk, but only to a degree. A high quality BPM methodology yields measures and controls which give to management a set of metrics to manage in a cost effective and process efficient manner. However, BPM is, at heart, directed to cost control and efficiency rather than real risk reduction. In other words, an organization may spend millions on effective BPM and still have substantial exposure to reputation risk.

Thus, effective reputation risk management depends upon identifying risk and control at each process point. However, because of downsizing, rightsizing, mergers, acquisitions, technology implementations, and outsourcing, organizations find an enormous disconnect between their process and controls. For example, the planned control environment instituted at some past time does not conform to the process which has been implemented to meet business and service demands. This means that risk remains in the organization.

Process management and risk reduction may be even more complex for organizations which have implemented Basel II or Business Process Management ("BPM"). Basel II's operational risk definition is very limited and overlapping areas of risk may not be considered in the analysis. This leaves wide gaps and vulnerabilities. In addition, organizations which have implemented BPM may have effectively "mapped processes" and inserted control measures to maximize efficiency and cost reduction, but the underlying analysis of reputation risk factors is rarely accomplished. Thus, in both cases, management is left with a false sense of security.

A need exists for the creation of an ongoing method of effective control and monitoring of process and risk management in an organization.

It is therefore an object of the present invention to provide an interactive risk management system and method to allow a user to navigate from process to process to access and review associated data, to thereby obtain information about selected processes and associated risks.

BRIEF SUMMARY OF THE INVENTION

The invention comprises an interactive risk management system and method implemented via a computer and monitor that displays to the user through the browser a multi-dimensional visual mapping of the processes of an organization, and allows the user to selectively view additional data, such as messages describing risks associated with the selected process. The user may navigate from one process to another process to access and review associated data, allowing the user to gain information about selected processes and associated risks.

BRIEF DESCRIPTION OF THE DRAWINGS

Preferred embodiments of the invention are described hereinbelow with reference to the drawings, wherein:

FIG. 10 is a display screen displaying a list of accessible reports, with the list being accessed from a yield sign indicator in FIG. 9;

DETAILED DESCRIPTION OF THE INVENTION

Figure 1:
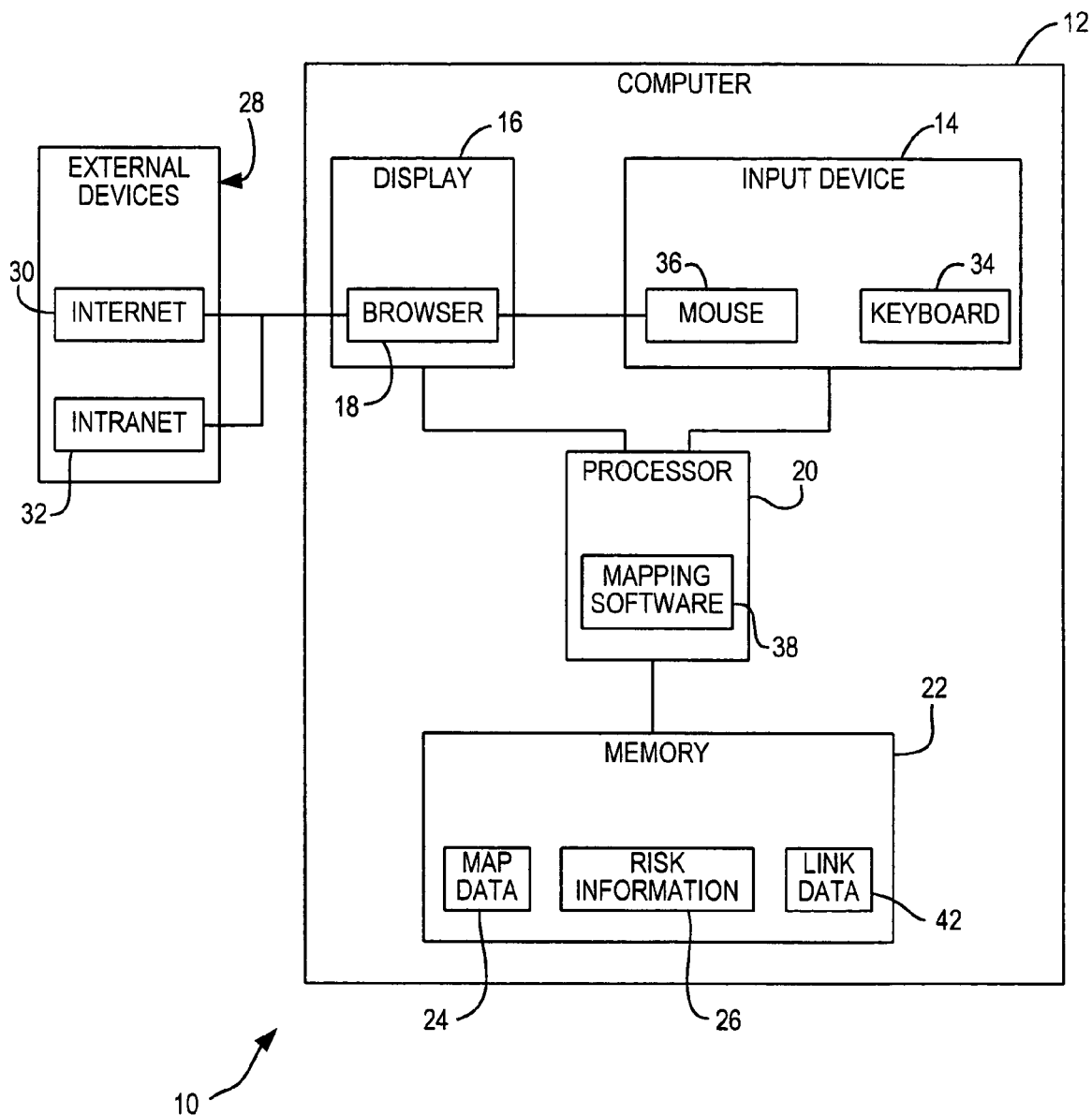
FIG. 1 is a schematic illustration of the interactive management system in accordance with the present invention.

As shown in FIGS. 1-8, an interactive risk management system 10 and method are described which visually display to the user, for example, via a computer monitor utilizing a browser, a mapping of processes of an organization, that allows the user to selectively view additional data, such as messages describing risks associated with any selected process. The interactive risk management system 10 and method may be sold or otherwise provided to users as a software application associated with the trademark "COOL" commercially available from "IMAG" and/or other entities providing the interactive risk management system 10 and method.

The user may navigate or move from process to process, for example, by use of the computer mouse or its equivalent, to access and review associated data, allowing the user to view, on screen or via a printout, information about selected processes and associated risks.

In one representative embodiment, an accounts officer of a bank may move through a series of displayed processes representing steps in the procedures of the bank, such as a new-accounts procedure for creating a new banking account for an applicant, or a loan approval procedure for a potential borrower. For each process, the accounts officer may view instructions, guidelines, policies, and risks associated with the process currently being reviewed, such as the bank's approved procedures for preventing money laundering.

The displayed processes may include actuatable display regions or icons so that when the accounts officer clicks the region with a mouse cursor, a hyperlink to additional information is activated by which the computer system retrieves the correspondingly hyperlinked information and displays it to the accounts officer. The linked information may be, for example, a pre-existing text of the warning signs to be noted by the accounts officer which indicates a money-laundering risk associated with the application or applicant being reviewed. The linked information may be displayed to the accounts officer through the browser, for example, as a separate web-page on the intranet of the bank, or in a pop-up dialog box displayed over the existing browser text.

In another representative embodiment, a medical technician in a hospital may move through a series of displayed processes representing steps in the procedures for performing diagnostic tests for patients, such as procedures implementing test requests from doctors and test approval from a health management organization (HMO) for performing X-ray or chemotherapy on a patient. At each process step, the medical technician may view instructions, guidelines, policies, and risks associated with the current process being reviewed, for example, the hospital's approved procedures for preventing unnecessary medical tests. The displayed processes may include actuatable display regions or icons so that when the medical technician clicks the region with a mouse cursor, a hyperlink to additional information is activated by the computer system to retrieve the correspondingly hyperlinked information, and to display this information to the medical technician. The linked information may be, for example, a pre-existing text of the warning signs to be noted by the medical technician which suggest medical fraud by a patient and/or a doctor. The linked information may be displayed to the medical technician through the browser, for example, as a separate web-page on the intranet of the hospital or in a pop-up dialog box displayed over the existing browser text.

As shown in FIG. 1, the interactive management system 10 and method includes a computer 12 having an input device 14, a display 16 for displaying a graphic user interface (GUI) including a browser 18, a processor 20, and a memory 22 for storing a mapping such as map data 24 comprising a plurality of processes and for storing at least one risk message or information 26 associated with at least one of the plurality of processes. The display 16 presents the browser 18 and GUI to the user and communicates with external devices 28 such as the Internet 30 or an intranet 32 associated with the organization implementing the interactive management system 10 and method.

The input device 14 may include a keyboard 34 and a mouse 36 for using the browser 18. Alternatively, the input device 14 and the display 16 may include a touch screen system (not shown) to be employed for inputs and outputs. The processor 20 operates the browser 18 and receives signals such as mouse input signals indicating actuation of icons or other actuatable display regions of the browser 18 by the user using the mouse 36. The processor 20 also uses mapping software 38 such as graphics software or any other software, for example, graphics software available from "MICROSOFT CORPORATION" commercially available under the trademark "MICROSOFT VISIO".

Figure 2:
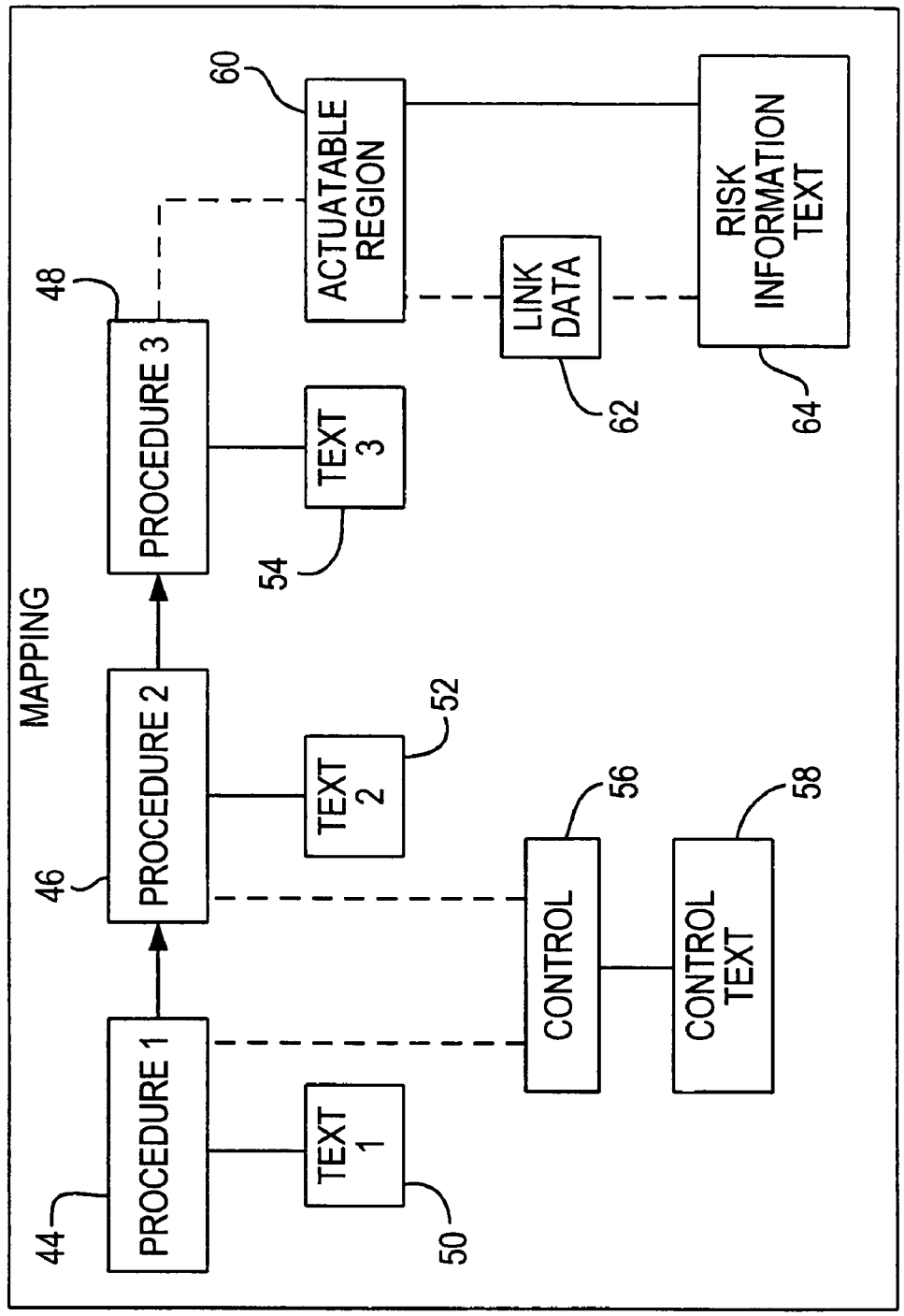
FIG. 2 is a schematic illustration of a mapping.
Figure 4:
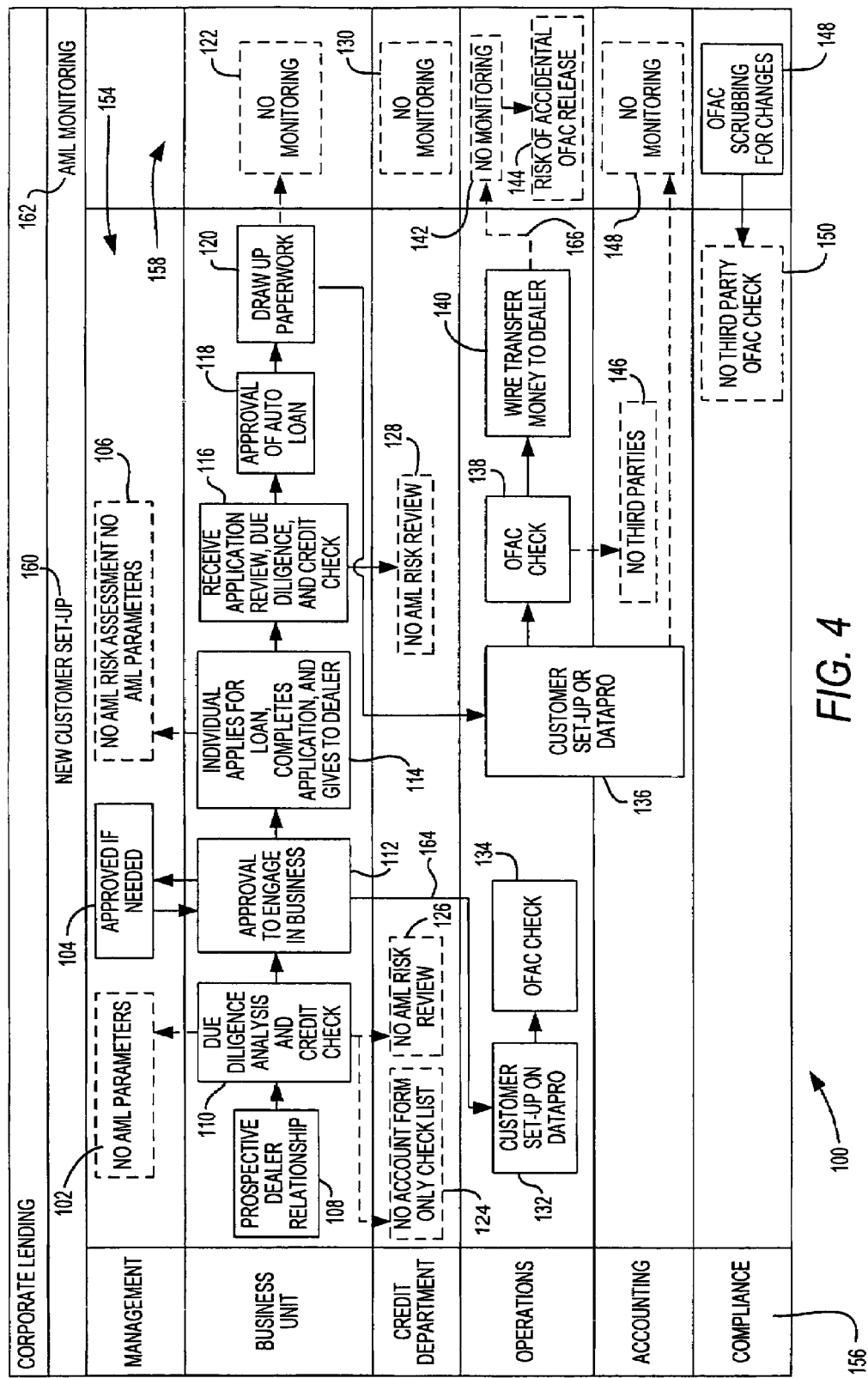
FIG. 4 is a display screen displaying a mapping.
Figure 5:
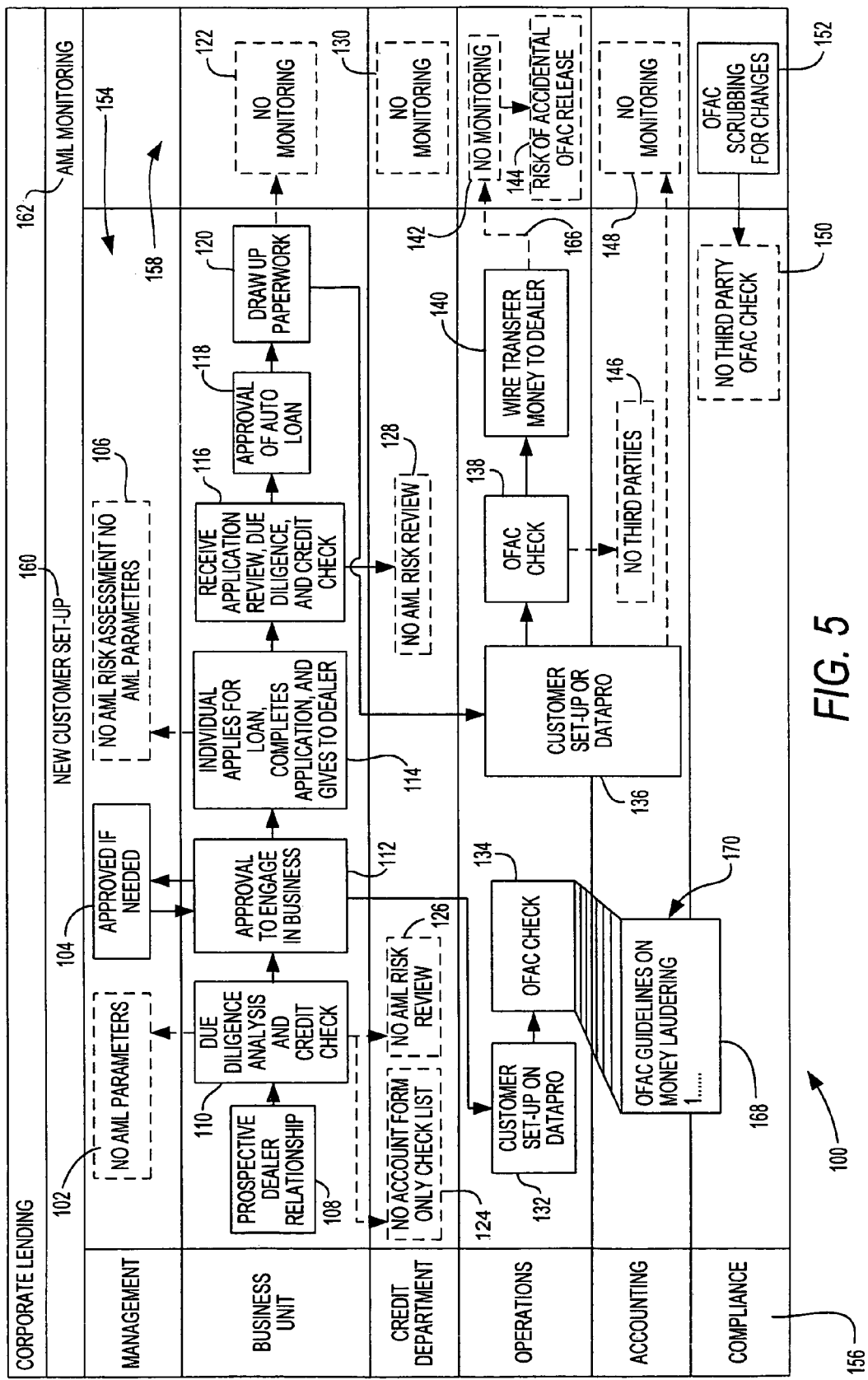
FIG. 5 is the display screen of FIG. 4 with a pop-up information window.

The processor 20 accesses the memory 22 to retrieve the map data 24 for displaying a mapping 40 on the browser 18, generally shown in FIG. 2 and as shown with the example mapping 100 in FIGS. 4-5. The memory 22 also stores risk information associated with specific processes which the processor 20 may access and display to the user navigating the displayed mapping 100. The memory 22 also includes link data 42, for example, corresponding to hyperlinks allowing the user to select and actuate an actuatable display region on the browser, such as icons or hot spots, to access additional information, such as the risk information 26 associated with a process corresponding to the selected actuatable display region.

Referring to FIG. 2, the mapping 40 includes the plurality of processes, such as procedures 44-48 to be followed in a predetermined sequence. Each procedure 44-48 includes an associated text 50-54, respectively, which may also include other information, such as graphics, audio and/or video describing or otherwise illustrating the respective procedure 44-48. The text of each procedure may also be a label displayed in the mapping through the browser 18, as shown in the blocks 102-152 representing processes in FIGS. 4-5. Other processes may include a control 56 with associated text 58 describing or labeling the control, with the control 56 being associated with a specific process associated with at least one other process, such as the procedures 44-46. For example, the control 56 may be a graphic and/or audible warning signal or red flag to the user when an associated process, such as procedure 44, is being accessed by the user.

The mapping 40 also includes actuatable regions 60 such as icons which are displayed with the corresponding text 54 for the procedures 48 associated with the actuatable region 60 in the displayed mapping 40 viewable through the browser 18. The actuatable region 60 is associated with predetermined link data 62, and stored in a set of link data 42 in memory 22, so that actuation of the actuatable region 60 causes the processor 20 to utilize the predetermined link data 62 as an address or hyperlink to retrieve the specific risk information text 64 associated with the predetermined link data 62, which is in turn associated with the actuatable region 60 corresponding to a specific procedure 48 being accessed by the user for additional information.

As used herein, the term "hyperlink" means any type of link, such as an Internet link, to another webpage, document, or other information in any format, and also to link to another part of the program or to other programs and/or databases accessed via the user's intranet. Specific examples and methods are described below.

Figure 3:
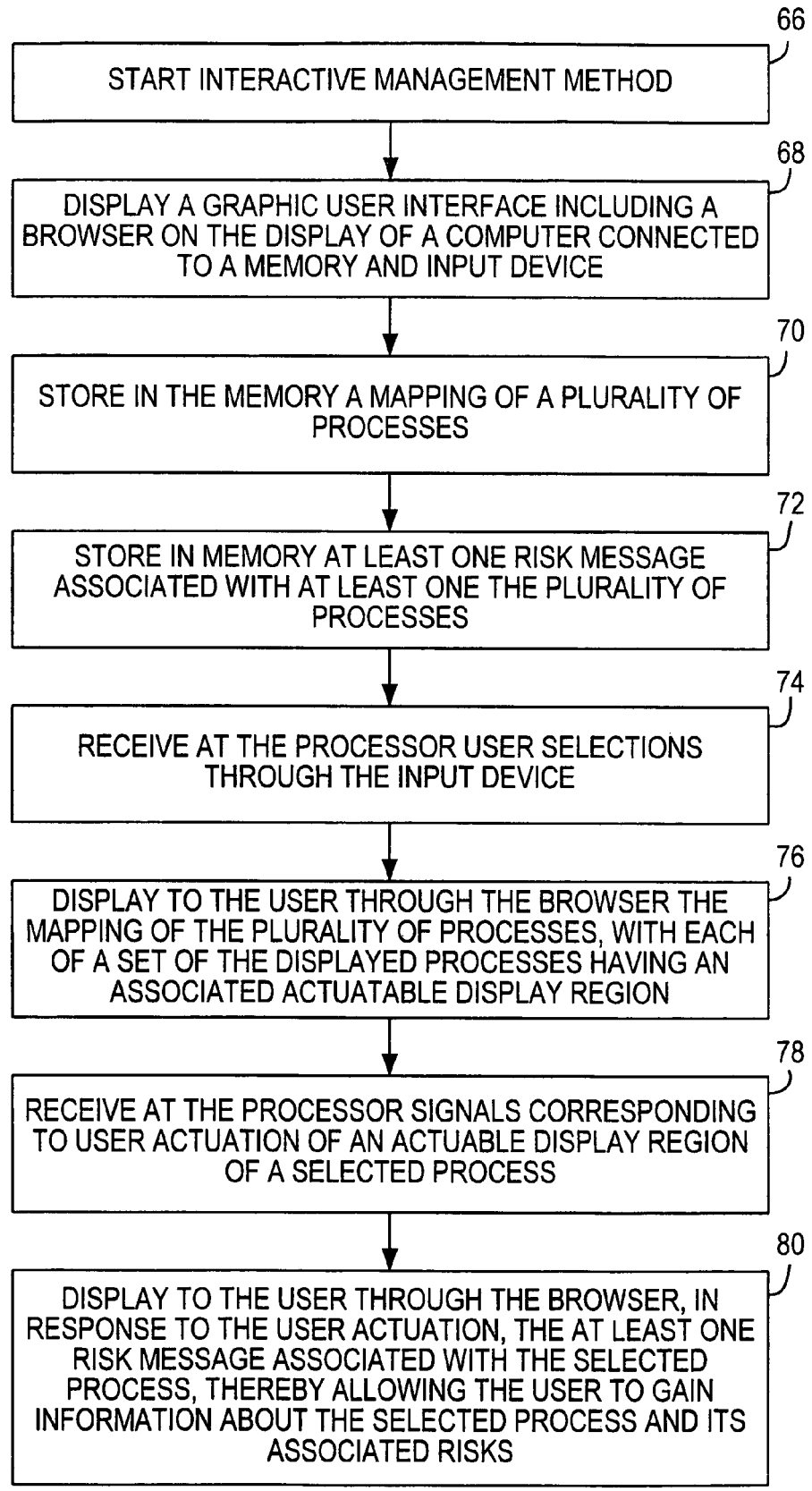
FIG. 3 is a flowchart of the method of operation of the interactive management system of FIG. 1.

As shown in FIG. 3, in operation, the interactive management system 10 starts in step 66 the interactive management method, and displays in step 68 a graphic user interface including the browser 18 on the display monitor or other screen 16 of the computer 12 connected to the memory 22 and the input device 14. The memory 22 stores in step 70 the mapping 40 of a plurality of processes, and stores in step 72 at least one risk message or information 26 associated with at least one of the plurality of processes. The processor 20 receives in step 74 user selections through the input device 14, and displays in step 76 to the user through the browser 18 the mapping 40 of the plurality of processes, with each of a set of the displayed processes having an associated actuatable display region 60.

The processor 20 receives in step 78 signals corresponding to user actuation of an actuatable display region 60 of a selected process, and the processor 20 causes the display 16 to display in step 80 to the user through the browser 18, in response to the user actuation, the at least one risk message or information 64 associated with the selected process, such as procedure 48, thereby allowing the user to gain information about the selected process and its associated risks.

In an example embodiment, the computer 12 may be a laptop, a personal computer, or terminal connected to a network or other external devices 28, such as the Internet 30 or a dedicated intranet 32 associated with the organization of the user, such as the bank for which a loan officer processes new loan applications.

The processor 20 is responsive to user selections through the input device 14 to display to the user, through the browser 18, the mapping 40 of the plurality of processes, with each of a set of the displayed processes having an associated actuatable display region 60. The processor 20 is also responsive to user actuation of the actuatable display region 60 of a selected process, and displays to the user through the browser 18 the at least one risk message or information 64 associated with the selected process.

The memory 22 is accessible through a computer network, so that any user using a browser 18, communicating through the computer network, may access and view the mapping 40 and may actuate the actuatable display regions 60 to selectively view the at least one risk message or information 64. The memory 22 may be a separate file server upon which the mapping 40 and other process data are stored. Alternatively or in addition, the memory 22 may be a removable storage medium such as a compact disk (CD) which may be updated regularly to reflect changes in the policies, processes and procedures of an organization. Accordingly, the interactive management system 10 and method may operate without local databases, but instead may be used in the field or used independently of the intranet 32 or internal computer network of the organization.

The computer 12 may communicate through the external devices 28, for example, to hyperlink to retrieve additional information as the user views processes in the mapping 40. In order to perform this information retrieval, actuatable display regions 60 are associated with the link data 62 addressing linkable data stored in the memory 22. The processor 20 responds to the actuation of a selective actuatable display region 60 to communicate with the memory 22 via the predetermined link data 62 to retrieve the corresponding linkable data.

The link data 42, 62 may be a hyperlink, such as a uniform resource locator (URL) or other types of addresses, or file or directory names, for accessing data stored in the memory 22 and/or in the external devices 28 in communication with the computer 12.

The processor 20 operates mapping software 38 to display the mapping 40 and the plurality of processes as graphical representations on the display 16, for example, in a multidimensional format and/or with color representations indicating types of processes, available information, warnings, and the like. The mapping software 38 displays subsets of the plurality of processes in a plurality of horizontal tracks or lanes, with the horizontal tracks oriented one above the other vertically. In one preferred embodiment, the mapping software 38 is the graphics software available from "MICROSOFT CORPORATION" under the trademark "MICROSOFT VISIO".

The interactive risk management system 10 and method described herein provides a new comprehensive solution for effective Enterprise Reputation Risk management, which requires a comprehensive methodology and implementation platform. Organizations, for example, in the financial services industry, may use the interactive risk management system 10 and method for identifying and reducing reputation risk, with a comprehensive analysis methodology which enables management to effectively identify, mitigate and control reputation risk for all products and services and all departments of the organization on an ongoing basis.

In performing the comprehensive Enterprise Reputation Risk analysis, solutions and controls, the interactive risk management system 10 and method may be used as a very cost-effective non-database solution with little or no information technology (IT) intervention or support required. In addition, the interactive risk management system 10 and method may be specifically designed to supplement and complement existing Basel II and business processing management (BPM) methodologies known in the art. The mapping of processes may be created with rapid turnaround, for example, average projects may be completed in about 120 days or even less.

As will be apparent to one of ordinary skill in the art, the timetable depends upon the availability of the organizations personnel for interviews with those preparing the mapping and the number of programmers applied to the project.

One advantage of the interactive risk management system 10 and method of the invention is the ability to facilitate effective monitoring, control and rightsizing of processes and risks in an organization, and provide a modern host environment for policies and procedures. For example, constant and consistent updating and version control may be assured throughout the organization.

For effective operation of the entire organization, the interactive risk management system 10 and method are excellent for controlling and monitoring branch offices and cross-border products, and are useful tools for planning and implementing control environments for new products, processes, systems and procedures. By implementing a readily-accessible mapping of processes, the interactive risk management system and method of the invention serves as an "organizational memory" and provides a permanent record regarding processes and controls.

The interactive risk management system 10 and method enable an organization to identify, control, and monitor Enterprise Reputation Risk and a series of carefully planned, interrelated elements are included. For example, effective reputation risk detection begins with two requirements: independence and experience. It may be very difficult to "cut through" the fabric of organizations in a totally objective manner. It requires skill and experience to know where to look, the areas to probe and the issues to analyze. It requires independence to ask difficult questions and to glean information from disparate, but interrelated parts of an organization.

Moreover, specialized experience is required to know how to analyze seamlessly between front and back offices and through all product and support areas from a variety of risk areas, in order to analyze and produce a mapping of the processes of an organization.

The interactive risk management system 10 and method analyze and allow for the monitoring of three key areas of risk: business (or "inherent") risk, regulatory risk, and operational risk.

Both the definitions of these key risk areas and their sub-risk components vary among financial services industries and even within common industries. In one perspective, the organization sets common definitions and risk factors so as to ensure that the analysis and mapping are consistent with the organizational environment and culture of the organization. Moreover, this element facilitates a dialogue between the creators of the mapping and management regarding alternative risk definitions and factors which may be common in the industry, but not fully developed or identified within a given organization.

Referring to FIGS. 3-5, in order to create the map of processes, interrelationships between processes may be determined and incorporated into the mapping 40. For example, one type of interrelationship is a control 56 of one process by another process. To be effective, a control 56 must be rationally connected to a particular process, must be specifically designed to mitigate the risks which exist at that point in the process and must be capable of measurement.

The interactive risk management system 10 and method, in a preferred embodiment, display the process mapping 40 using highly visible, colorful, three-dimensional maps, for example, in the "MICROSOFT VISIO" format, designed to simultaneously display horizontal or cross-organizational processes, and vertical or drill-down processes. Once the maps are completed, they present a unique, three-dimensional "as is" picture of the organization's processes from a risk standpoint.

As shown in the illustrative screen shots in FIGS. 4-5, the interactively displayed mappings 40 may be displayed on a browser 18 in the form of labeled blocks corresponding to predetermined processes showing their interrelationships. In the example mapping 100 shown in FIG. 4, a bank's loan officer may view the mapping 100 for performing corporate lending procedures. The mapping 100 includes a plurality of labeled blocks 102-152, each corresponding to a specific process or procedure for performing corporate lending, such as setting up new customers and monitoring anti-money laundering (AML) practices according to procedures and guidelines of the Office of Foreign Assets Control (OFAC) established by the U.S. Treasury.

Common types of processes performed are generally are laid out in sequence in at least one lane or track 154, with the processes in each lane being horizontally displayed with appropriate labels 158 on each lane. In addition, common cross-type activities are grouped in vertical columns 156, such as new customer set-up and AML monitoring, with appropriate labels 160, 162 for each vertical column.

For example, in a management track, a "No AML Parameters" process 102, an "Approval if Needed" process 104, and a "No AML Risk Assessment, No AML Parameters" process 106 are displayed. In a business unit track, a "Prospective Dealer Relationship" process 108, a "Due Diligence Analysis, and Credit Check" process 110, an "Approval to Engage in Business" process 112, an "Individual Applies for Loan, Completes Application, and Gives to Dealer" process 114, a "Receive Application Review, Due Diligence, and Credit Check" process 116, an "Approval of Auto Loan" process 118, a "Draw Up Paperwork" process 120, and a "No Monitoring" process 122 are displayed. In a credit department track, a "No Account Form, Only Check List" process 124, a "No AML Risk Review" process 126, a "No AML Risk Review" process 128, and a "No Monitoring" process 130 are displayed.

In an operations track, a "Customer Set-up on DataPro" process 132, an "OFAC Check" process 134, a "Customer Set-up on DataPro" process 136, an "OFAC Check" process 138, a "Wire Transfer Money to Dealer" process 140, a "No Monitoring" process 142, and a "Risk of Accidental OFAC Release" process 144 are displayed.

In an accounting track, the "Customer Set-up on DataPro" process 136 is also displayed, along with a "No Third Parties" process 146, and a "No Monitoring" process 148. In a compliance track, a "No Third Party OFAC Check" process 150, and an "OFAC Scrubbing For Changes" process 152 are displayed.

The various processes may be connected by arrows 164, 166 illustrating the step-by-step flow from one process to the next. The solid arrows 164 may indicate a definitive process to be performed after the current process, such as a customer set-up 132 being performed after approval to engage in business 112. Other types of arrows, such as dashed arrows 166, may show optional branching or decisions based on completion of a current process. For example, after a wire transfer 140 is performed, the organization may flag the wire transfer for "no monitoring" 142. The risk of accidental OFAC release 144 of personal information may also be viewed by the loan officer.

Predetermined processes such as processes 108-120 may be illustrated with blocks having solid lines, while such optional processes 102-106, 122-130, and 142-150 may be displayed with blocks having dotted lines. As an alternative to, or in addition to, rectangular blocks, color coding, solid arrows, solid lines, dotted arrows, and dotted lines may be shown in the mapping 100, and the interactive management system 10 and method may display the mapping using different colors, different shading of the arrows and/or blocks, and different shapes for the blocks, such as red borders for very important processes to be performed. Other types of graphics such as stop signs may be used.

Using the mappings of FIG. 4, a user such as a loan officer may access and view addition information. For example, one or more of the processes or procedures 102-154 may have an associated actuatable region as described above in conjunction with FIG. 2, so that actuation of a selected process by clicking a mouse button or equivalent device, when the mouse cursor overlaps the selected process, causes the processor to access the corresponding link data to access and retrieve associated risk information text associated with the selected process.

For example, referring to FIGS. 4-5, when the user selects the "OFAC Check" process 134 in FIG. 4, the associated link generates a pop-up information box 168, as shown in FIG. 5, to display to the user the organization's policy for risk management involving an OFAC checking procedure. The information box 168 may include display controls 170 such as a slidable icon to scroll through a page of the information on the displayed topic.

It is to be noted that, although the information box 168 overlaps the Accounting and Compliance tracks, the pop-up information box 168 is not a separate process in the track, but is only displayed on the mapping 100 temporarily and is associated with the actuated process 134.

Through the mapping 100 shown in FIGS. 4-5, with additional accessible information such as the information box 168, the interactive risk management system and method permit a user to perform a Risk Diagnostic Analysis and Solution Mapping function to bring together multiple aspects of process management, for example, process operation, risk identification, and a solution meeting the needs of the user. The interactive risk management system and method of the invention act as effective tools for risk and solution analysis. During creation of the process mapping, business, regulatory, and operational risks which exist at each process step are identified and connected, and practical and effective solutions as well as controls are established which mitigate the identified risks. The risk analysis and proposed control solutions are embedded in the three-dimensional mapping so that, in a very short time, management and staff are presented, by the interactive risk management system 10 and method and their map and data presentation format, both their verified process flows as well as an analysis of identified risks and solutions. These mappings are easy to understand and lead to important and practical explanations of ways to mitigate risk.

Figure 6:
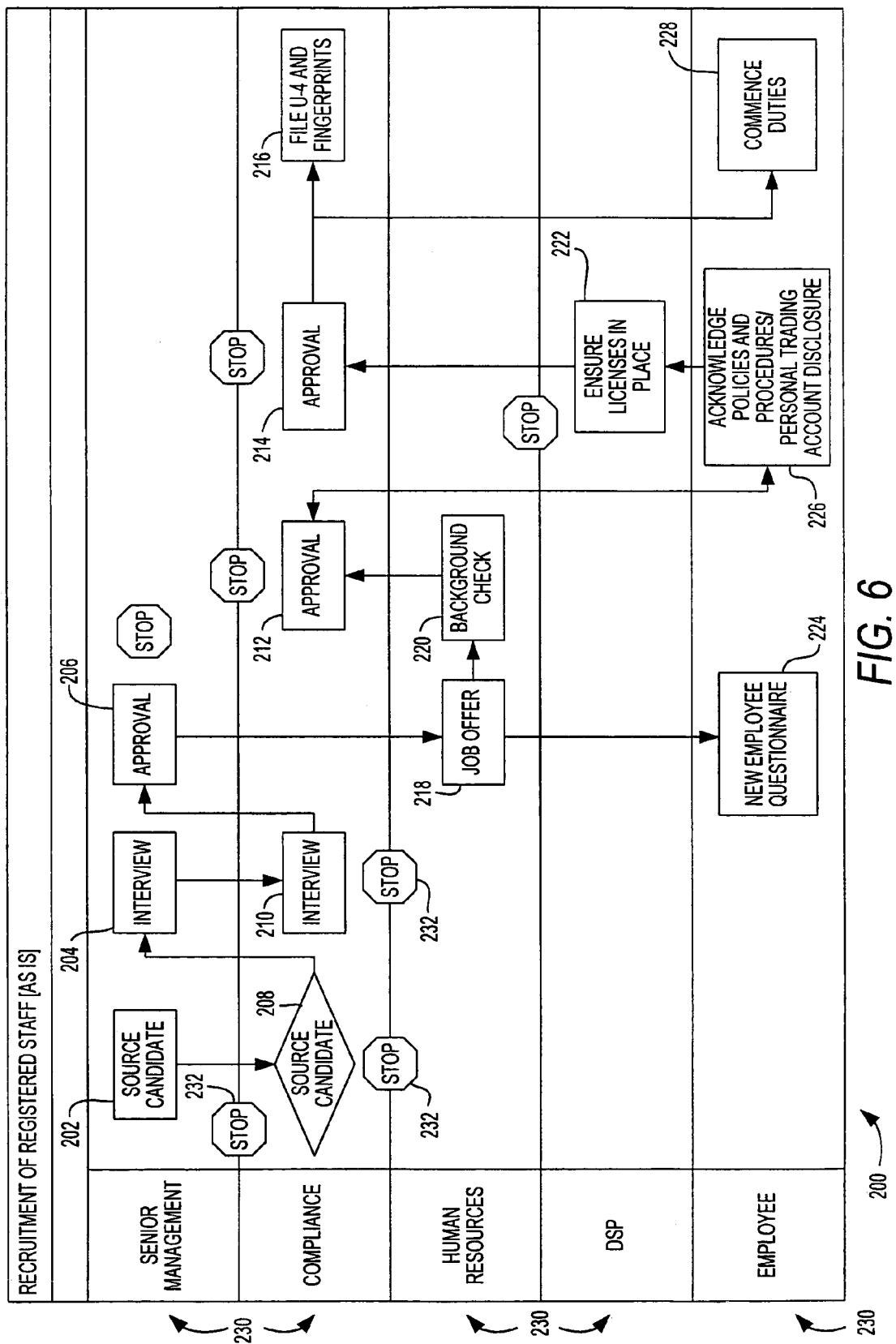
FIG. 6 is a display screen displaying an alternative embodiment of a mapping.
Figure 7:
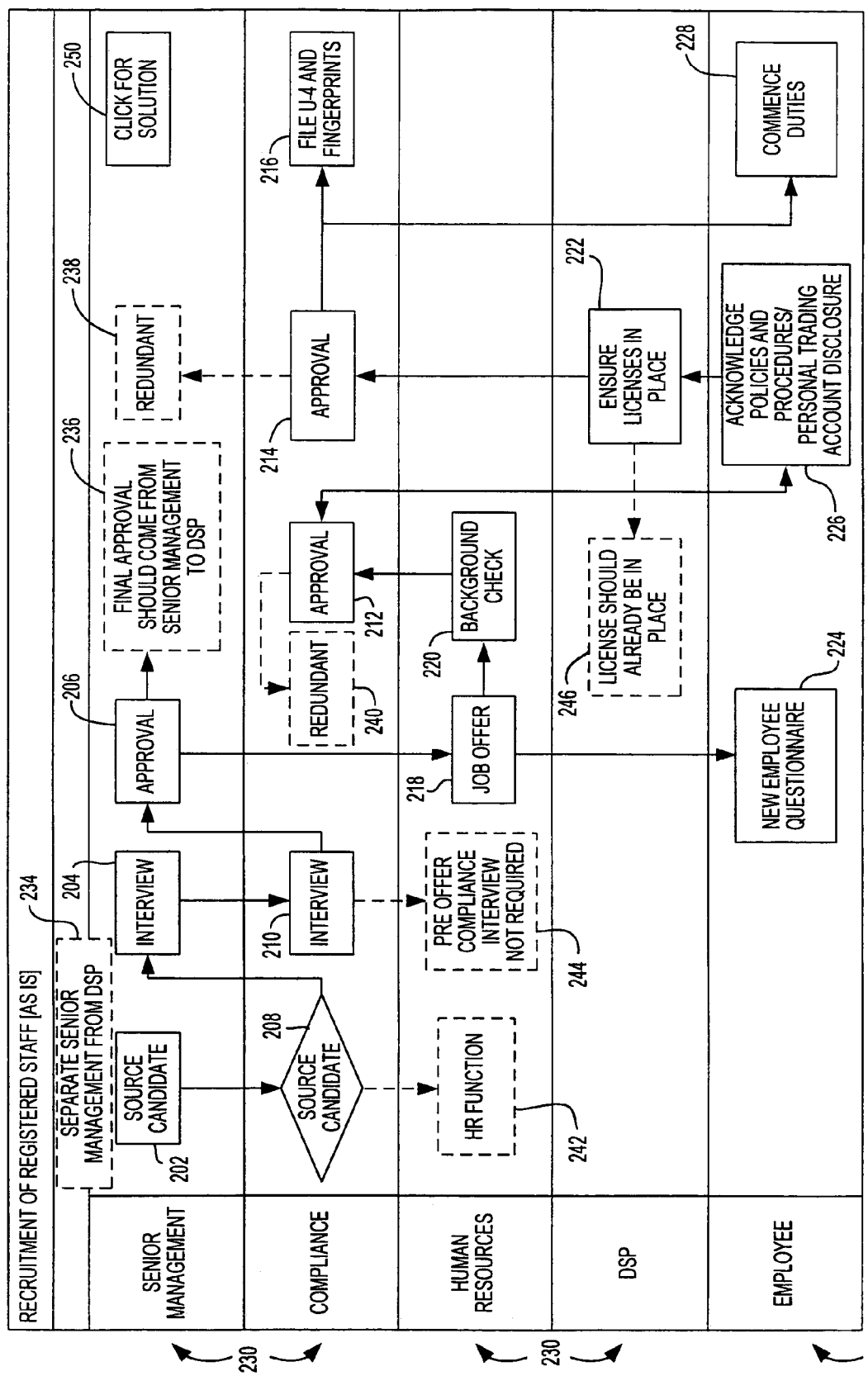
FIG. 7 is a display screen displaying a modification of the mapping of FIG. 6.
Figure 8:
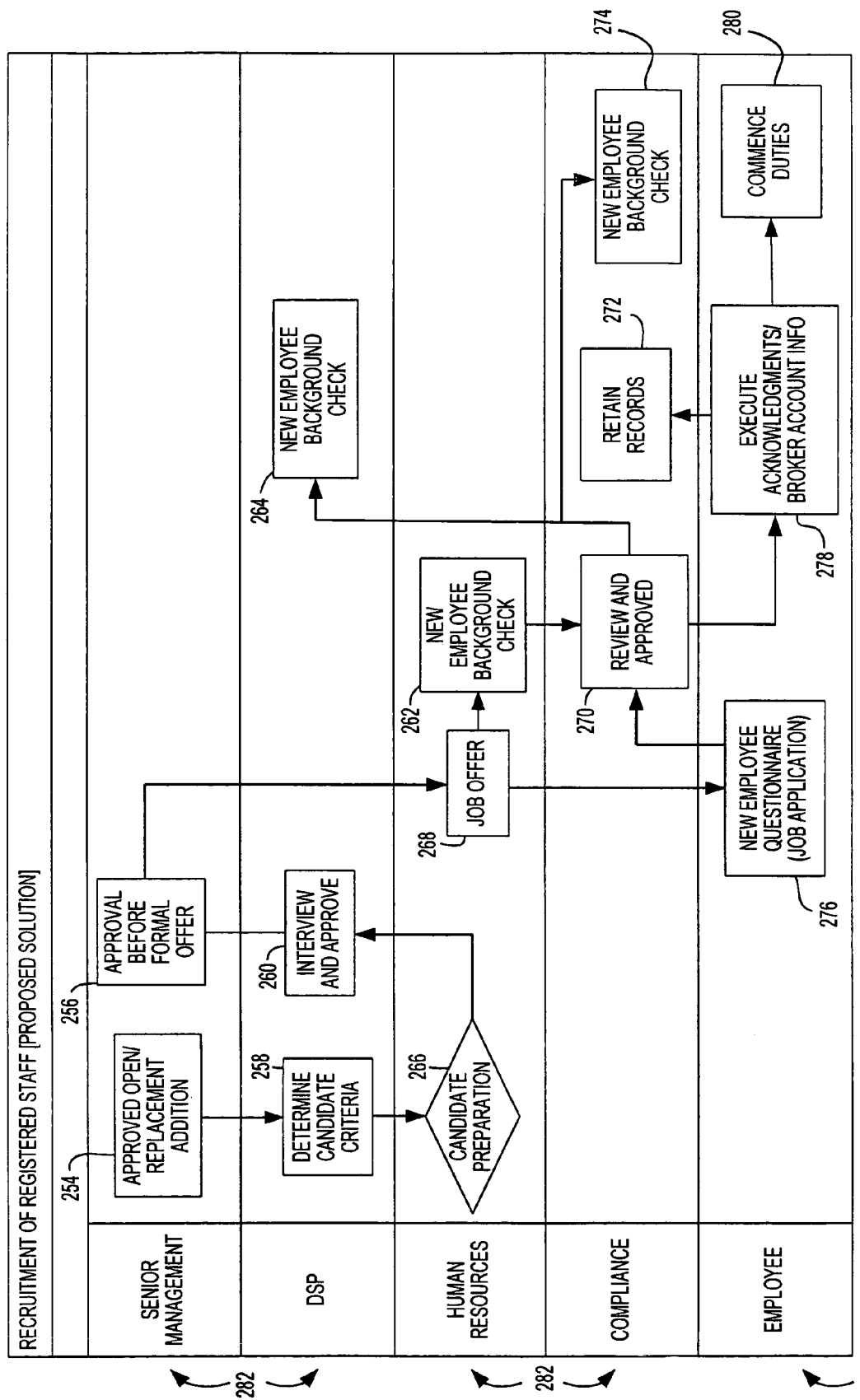
FIG. 8 is a display screen displaying another modification of the mapping of FIG. 6.

In an alternative embodiment, shown in FIGS. 6-8, the interactive risk management system and method may make use of indicators and/or other indicia or images, such as displayed stop signs, to indicate to the user that the process displayed substantially adjacent to the stop sign has an associated risk.

For example, FIG. 6 illustrates a display screen displaying the alternative embodiment of a mapping 200, in which a plurality of processes 202-228 are organized into a plurality of tracks 230, for example, to map and illustrate to the user the procedures employed by an organization in the recruitment of registered staff. As described in connection with FIGS. 4-5 and the mapping 100, the processes 202-228 of the mapping 200 may include actuatable regions which, upon activation by the user, provide additional information about the associated process selected by the user to access and review the information.

Specific processes, such as the processes 202, 206, 208 and 210, may have associated risks for which additional information is available. Accordingly, the interactive risk management system and method flags such processes or otherwise alerts the user of possible risks using visual and/or audible signs and/or signals, such as the image of stop signs 232. Alternatively or additionally, other visual cues such as the use of different colors for the stop signs 232 that contrast with the color of the process blocks 202-228 and/or flashing colors of the stop signs 232 or of the process blocks 202-228 may also be used to visually notify the user of additional information, for example, of a risk associated with a given process.

Such stop signs 232 may also be actuatable regions, so that actuation of a stop sign causes the mapping 200 to display one or more risk information blocks 234-246 in a modified mapping 248, as illustrated in FIG. 7. The risk information blocks 234-246 may be displayed in one or more of the tracks 230 only for illustrative purposes, so that the risk information blocks 234-246 are positioned substantially adjacent to their respective processes 202-228.

The risk information blocks 234-246 may have visual indicators such as dashed lines instead of the solid lines of the process blocks 202-228, as shown in FIG. 7, or colored blocks which contrast the colors of the process blocks 202-228. The user is thereby provided with visual cues to indicate that the risk information blocks 234-246 are separate and distinct from the process blocks 202-228.

In addition, the risk information blocks 234-246 may also be actuatable regions through which the user may access additional information, that is, actuation of one of the risk information blocks 234-246 causes the interactive risk management system 10 and method to retrieve and access additional and/or explanatory risk information.

As described herein and shown in FIGS. 4-7, the mappings 100, 200 may reflect an existing structure of an organization. The interactive risk management system 10 and method may also be used to display to the user a proposed solution to the existing structure to minimize or eliminate risks associated with the various processes.

For example, the mapping 248 of FIG. 7 displays the associated risks in risk information blocks 234-246 of the processes illustrated in the original mapping 200 in FIG. 6. On the mapping 248, an actuatable region or icon 250 may be provided to access a solution mapping, as shown in FIG. 8. Note that the position of the solution icon 250 is arbitrary, that is, the positioning of the solution icon near a process, such as the process 216, or in a track 230, does not indicate that the solution mapping is only associated with the nearby process 216 or track 230.

FIG. 8 illustrates a display screen displaying another modification of the mapping of FIGS. 6-7. The mapping 252 in FIG. 8 illustrates a solution mapping which minimizes or eliminates the risks described in the risk information blocks 234-246 of FIG. 7. The solution mapping 252 has a plurality of processes 254-280 organized in at least one track or lane 282, which provides a proposed or final solution to the user in the form of a revision to the organization in a manner that minimizes or eliminates the risks, for example, in the recruitment of registered staff.

As shown in FIG. 8, and in comparison to FIGS. 6-7, the solution mapping 252 may have processes 254-280 which are different from the original processes 202-228 of the organization, and such processes 254-280 may be organized in tracks 282 or lanes different from the tracks 230 in FIGS. 6-7. Some or all of the processes 254-280 may be common to the processes 202-228, such as the "Interview" processes 218, 268 and the "Commence Duties" processes 228, 280, and similarly some or all of the tracks 282 may be common to the tracks 230, such as an "Employee" track or lane and an "HR" or "Human Resources" track or lane.

However, despite any common processes or tracks, the solution mapping 252 is distinct from the original mapping 200 in that the processes 202-228 are re-arranged, modified, and/or deleted, and new processes may be added to present a proposed solution that minimizes or eliminates the risks in the overall organization.

Accordingly, an initial mapping may be prepared, and once management reviews and agrees on risk-mitigating solutions, the initial mapping may be revised to re-map the process flows to reflect the new control environment. The new maps reflect actual process flows and/or solutions with control points duly noted. Policies, procedures, forms, and information sources, as well as web-links, may be amended to conform to the new controls and may be hyperlinked directly to process steps on the maps. Using the interactive risk management system 10 and method, staff members may access and know exactly what steps to follow at each process point to mitigate risk.

In addition to viewable process steps, "control boxes" are viewable and accessible within the flow for process monitoring on an ongoing basis. For organizations which have implemented BPM, the interactive risk management system 10 and method is designed to work in conjunction with the metrics and controls which are being implemented.

The maps are available to all staff via their web browser, for example, through the organization's intranet 32. Each member of the staff has the ability, with a click of the mouse button, to access all processes within a given product, service or area from the highest level to the day-to-day work within a department. Control points are easily visible and applicable procedures and forms are only a click away from a given process step. The "control boxes" ensure that the process flow, which already conforms to the "as is" process of the organization, is followed and make monitoring easy to accomplish.

Once the basic structure of the organization, including its procedures and polices, is mapped by the interactive risk management system and method, third parties may verify and update the maps regularly or on an as-needed basis, and may make the maps available on a web-hosted basis.

ADDITIONAL EMBODIMENTS

In additional embodiments shown in FIGS. 9-12, the interactive risk management system 10 and method may make use of indicators and/or other indicia or images in addition to and/or instead of stop signs to alert the user of the presence of additional risk analysis features within the displayed mappings, and so providing an enhanced mapping of the interactive risk management system and method.

In some embodiments of the present invention, significant control weaknesses are indicated in the mappings by stop sign images, which are linked and/or hyperlinked to an analysis page or other information, and optionally a proposed solution. To enhance the functionality of the mappings to be used as risk analysis and solution tools, the mappings may be expanded in additional embodiments to incorporate different and/or deeper analysis of the operational risks addressed by the interactive risk management system and method of the present invention.

Figure 9:
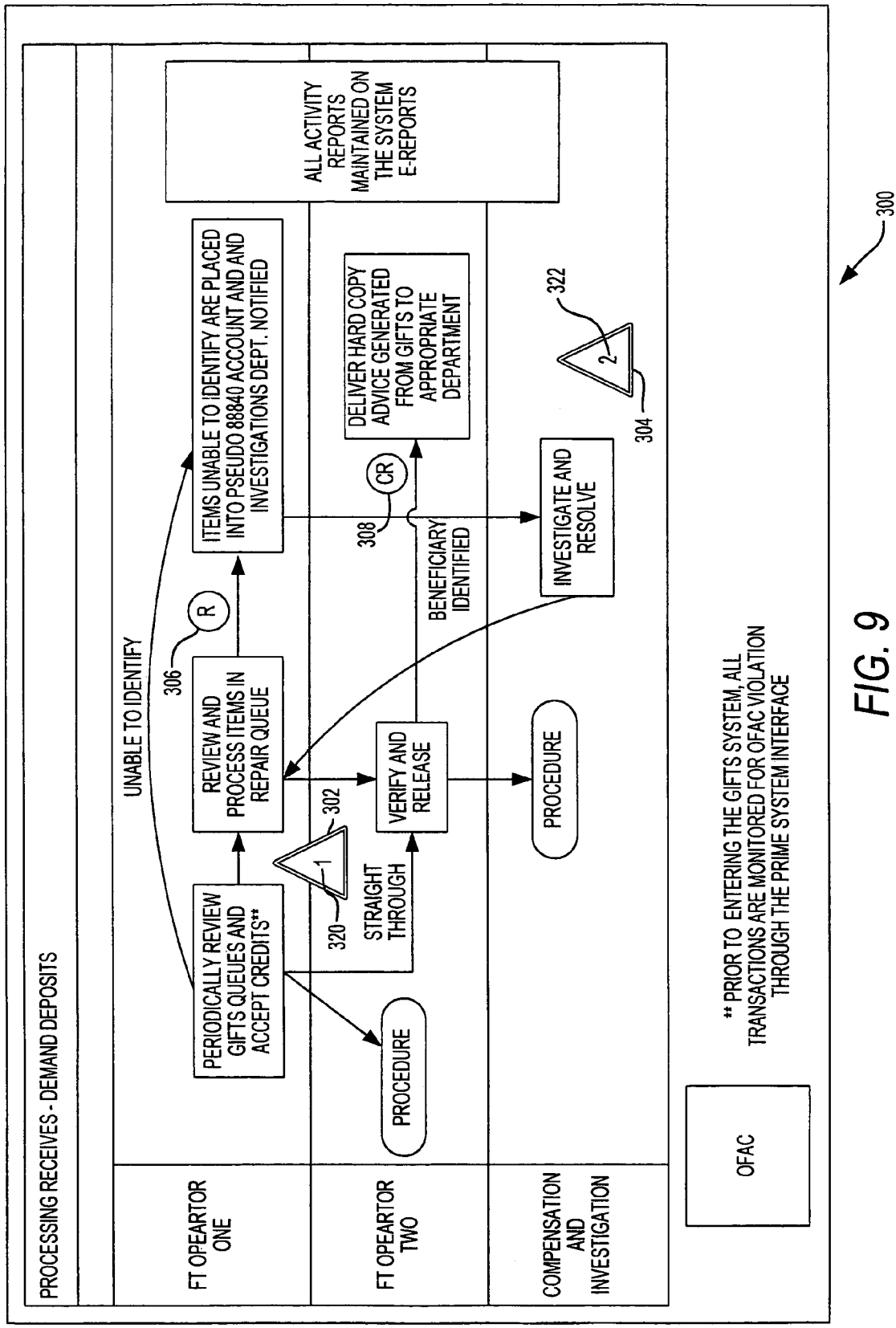
FIG. 9 is a display screen displaying another embodiment of the mappings, showing the use of yield sign indicators.

FIG. 9 is a display screen 300 displaying the additional embodiment of the mappings, showing the use of yield sign indicators 302, 304 and the other indicators 306, 308 indicated by circles which embed and allow access to operational risk control reports within the mappings. Such indicators may include a displayed yield sign 302, 304, an "R" in a circle 306, and a "CR" in a circle 308, to indicate to the user that the processes displayed substantially adjacent to the displayed indicators have additional information. Such circles 306 displaying an "R" may be a green color or any other predetermined color, and the circles 308 displaying a "CR" may be green, amber, or red, or any other predetermined color, with such colors providing additional visual cues or indications to the user of the status of the process and any additional information associated with the process.

The stop sign image may continue to be used as shown in FIG. 6 to signify a significant control-related weakness requiring immediate management attention, while the yield signs 302, 304 signify an important control consideration or an enhancement to the risk control infrastructure of the entity or facility which is recommended.

By accessing the yield signs 302, 304, for example, by clicking a mouse when the mouse cursor is over the selected yield sign, a display screen 310 as shown in FIG. 10 is generated for displaying a list of accessible control reports, with corresponding GUI actuation regions 312, 314 with text such as "Report of Repaired Items" and "Report of Compensation Claims", respectively.

Information associated with the reports and corresponding actuation regions 312, 314 may include a reference number, a specific operational risk, a priority ranking, risk attributes, effectiveness values, a name or initials of an owner, a frequency of providing a control report, and a frequency of monitoring the process. Such accessible reports reflect operational risk analysis of the corresponding processes associated with the corresponding yield signs. The list 310 is accessed from the yield sign indicators 302, 304 in FIG. 9, with examples of such accessible reports, displayed via actuation of the regions 312, 314, shown in the display screens 316, 318 of FIGS. 11-12, respectively. Each report may be indexed by a reference number shown within the corresponding yield sign, such as the first report labeled by reference number "1" in the list 310 with a corresponding label 320 displayed in the first yield sign, and the second report labeled by reference number "2" in the list 310 with a corresponding label 322 displayed the second yield sign.

Figure 11:
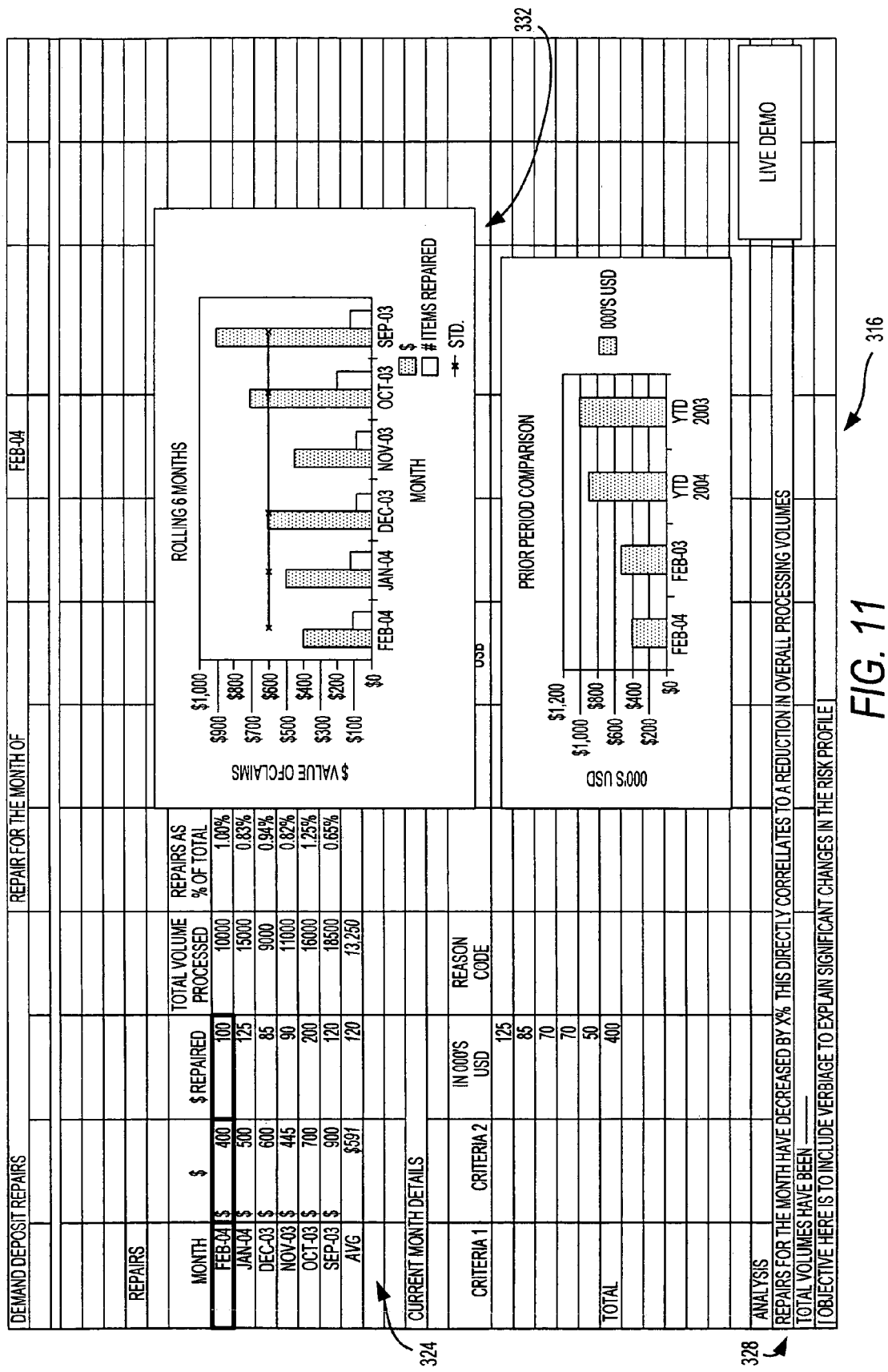
FIG. 11 is a display screen displaying a first report.
Figure 12:
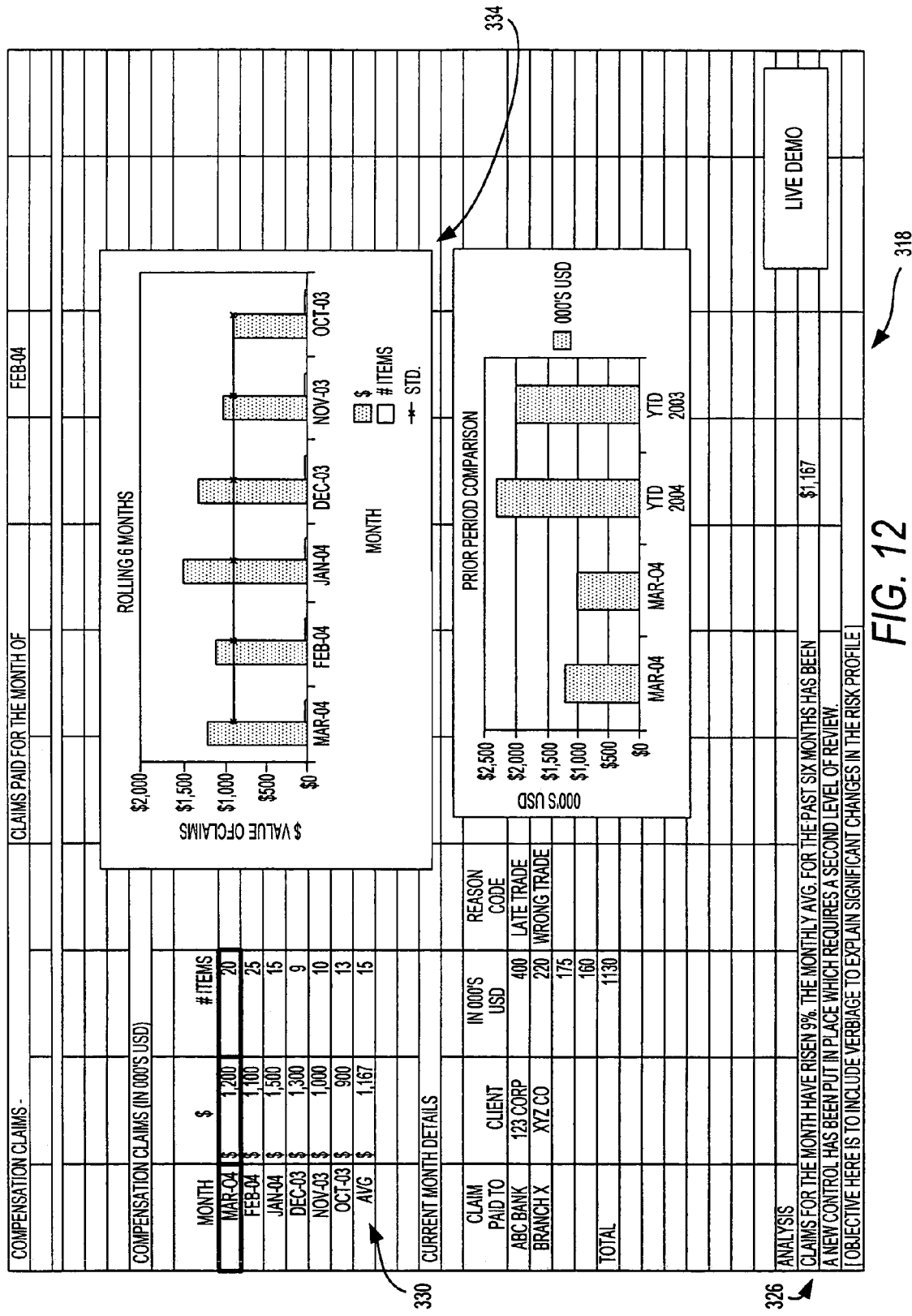
FIG. 12 is a display screen displaying a second report.

FIG. 11 is a display screen 316 displaying a first report corresponding to the first yield sign 302 which reports repaired items over various periods of time. FIG. 12 is a display screen displaying a second report corresponding to the second yield sign which reports compensation claims over various periods of time. Such reports may include a spreadsheet, such as a "MICROSOFT" "EXCEL" spreadsheet, or a report, image, and/or printout generated by such spreadsheets or other software, such as "MICROSOFT" "WORD" word-processing software, "MICROSOFT" "ACCESS" database software, or "ADOBE" "ACROBAT" image software. As shown in FIGS. 11-12, the reports may include data 324-326, text 328-330, and/or graphics or images 332-334, such as charts including bar charts.

Regarding the other types of indicators, in an example embodiment, the "R" in the green circle 306 in FIG. 9 may be actuated by clicking the mouse when the mouse cursor is over the green circle 306, and such actuation causes the display of a management report produced in the normal course of business. In the example embodiment, the "CR" in a colored circle 308, as shown in FIG. 9, provides access, for example, by mouse actuation, to control reports specifically developed to control a certain defined element of operation risk. A "CR" in a green circle indicates the availability of a report which has been produced but with no specific risks or considerations to be acted on. "CR" in an amber circle indicates an enhancement or recommendation to a control report which management should consider. A "CR" in a red circle indicates either the lack of a control report at a critical risk junction or a significant enhancement which is required in an existing control report in order to make the control report effective to measure the identified risk. Alternatively, instead of letters, number, symbols, and combinations of letters, numbers, and/or symbols may be displayed in the circles.

Other letters or symbols in circles or other geometric shapes, as well as other predetermined colors shading such geometric shapes, may be used to indicate the type and/or nature of the corresponding reports, and to provide corresponding reports upon GUI actuation, according to a predetermined report indicator scheme, such as the stop and yield signs and colored and labeled circles described herein.

In the case of control reports, the user of the interactive risk management system and method, with such mappings and visual indicators, has the ability to link and/or hyperlink from the indicators, such as a report circle, to an analysis page in which a chart sets forth salient details about the report, such as the name of the report; its purpose, for example, in terms of the risk being controlled; to whom the report is circulated; the frequency of production of such reports; and indicators of who is responsible for monitoring such risks. The interactive risk management system and method may also hyperlink to a copy of the relevant report itself.

What is claimed is:

1. An interactive risk management system for an organization comprising:
    a computer including:
        a processor;
        an input device;
        a display device for displaying a graphic user interface including a browser;
        a memory; and
        a multi-dimensional mapping for visual display of steps of a plurality of processes carried out by the organization and at least one risk message associated with at least one of the steps, wherein the mapping includes a plurality of horizontal lanes corresponding to at least one process carried out by a unit of the organization having at least one step in one of the plurality of horizontal lanes that is vertically connected to a step in a different horizontal lane that is carried out by another unit of the organization, the multi-dimensional mapping being stored in the memory;

wherein the processor, in response to user selections through the input device, displays to the user through the browser the multi-dimensional mapping of the plurality of processes, with each of a set of the displayed processes having an associated user actuatable display region; and wherein the processor, in response to user actuation of an actuatable display region of a selected step, displays to the user through the browser the at least one risk message associated with the selected step, thereby displaying to the user information about the selected step and its associated risks;

wherein the processor operates mapping software to display the mapping and the steps of the plurality of processes carried out by the organization as graphical representations on the display; and wherein the mapping software displays a graphical image on the display to indicate risk information available to the user.

2. The interactive risk management system of claim 1, wherein the memory is accessible through a computer network, whereby any user, using the browser and communicating via the computer network, may access and view the mapping and may actuate the actuatable display regions to selectively view the at least one risk message.

3. The interactive risk management system of claim 2, wherein the computer network is an intranet.

4. The interactive risk management system of claim 2, wherein the computer network is the Internet.

5. The interactive risk management system of claim 1, wherein the actuatable display regions are associated with link data addressing linkable data stored in the memory; and wherein the processor, in responsive the actuation of a selective actuatable display region, communicates with the memory via a respective link data to retrieve the corresponding linkable data.

6. The interactive risk management system of claim 5, wherein the link data is a hyperlink.

7. The interactive risk management system of claim 1, wherein the mapping software displays a graphical stop sign image on the display to indicate risk information available to the user.

8. The interactive risk management system of claim 1, wherein the mapping software displays the processes in a multi-dimensional format.

9. The interactive risk management system of claim 1, wherein the mapping software is graphics software.

10. The interactive risk management system of claim 1, wherein the graphical image includes a yield sign.

11. The interactive risk management system of claim 1, wherein the graphical image includes a circle with a letter therein.

12. The interactive risk management system of claim 11, wherein the letter in the circle is determined by the type of a report, accessible by actuation of the circle, according to a predetermined indicator scheme.

13. The interactive risk management system of claim 11, wherein a color of the circle is determined by the nature of a report, accessible by actuation of the circle, according to a predetermined indicator scheme.

14. An interactive risk management method for providing risk information associated with one or more of a plurality of processes of an organization, the method comprising the steps of providing a computer including a processor, an input device, a display device, and a memory;

displaying a graphic user interface including a browser on the display device;

storing in the memory a multi-dimensional mapping for visual display of steps of a plurality of processes carried out by the organization and at least one risk message associated with at least one of the steps;

wherein the mapping includes a plurality of horizontal lanes corresponding to at least one process carried out by a unit of the organization having at least one step in one of the plurality of horizontal lanes that is vertically connected to a step in a different horizontal lane that is carried out by another unit of the organization;

receiving at the processor user command signals entered through the input device;

displaying to the user through the browser the multi-dimensional mapping of the plurality of processes, with each of a set of the displayed processes having an associated actuatable display region;

receiving at the processor signals corresponding to user actuation of an actuatable display region of a selected step;

displaying to the user through the browser, in response to the user actuation, the at least one risk message associated with the selected step, thereby displaying to the user information about the selected step and any associated risk;

operating mapping software using the processor to display the mapping and the steps of the plurality of processes carried out by the organization as graphical representations on the display; and displaying a graphical image on the display using the mapping software to indicate risk information available to the user.

15. The interactive risk management method of claim 14, further comprising:

providing inputs by users using the input device and a browser connected to a computer network;

communicating command signals through the computer network to access and display to the user the mapping; and actuating the actuatable display regions to selectively view the at least one risk message.

16. The interactive risk management method of claim 15, wherein the computer network is an intranet.

17. The interactive risk management method of claim 15, wherein the computer network is the Internet.

18. The interactive risk management method of claim 14, further comprising:

associating actuatable display regions with link data addressing linkable data stored in the memory;

responding at the processor to actuation of a selective actuatable display region to communicate with the memory via a respective link data; and retrieving the corresponding linkable data.

19. The interactive risk management method of claim 18, wherein the link data is a hyperlink.

20. The interactive risk management method of claim 14, wherein the mapping software is graphics software.

* * * * *